United States Patent [19]

Ferguson et al.

[11] 4,226,670
[45] Oct. 7, 1980

[54] MATERIAL INJECTION NOZZLE FOR PULSE JET DRYING SYSTEMS

[75] Inventors: Frederick A. Ferguson, Yelm, Wash.; Rodney D. Payne, Saratoga, Calif.

[73] Assignee: Sonic Dehydrators, Inc., Weiser, Id.

[21] Appl. No.: 969,397

[22] Filed: Dec. 14, 1978

[51] Int. Cl.² ............................................. B01D 1/14
[52] U.S. Cl. ................................ 159/16 R; 159/4 A; 159/4 E
[58] Field of Search ........................ 159/4 A, 4 E, 16

[56] References Cited

U.S. PATENT DOCUMENTS

| | | | |
|---|---|---|---|
| 2,834,146 | 5/1958 | Bertin et al. | 43/147 |
| 2,838,869 | 6/1958 | Desbenoit et al. | 43/147 |
| 2,887,390 | 5/1959 | Coulter et al. | 159/4 |
| 3,586,515 | 6/1971 | Anderson | 99/209 |
| 3,618,655 | 11/1971 | Lockwood | 159/4 A |

*Primary Examiner*—Norman Yudkoff
*Attorney, Agent, or Firm*—Christensen, O'Connor, Johnson & Kindness

[57] ABSTRACT

A material injection nozzle for a spray drying system of the type wherein the material to be dried is introduced into the exhaust pipe of one or more pulse jet engines and borne upwardly through openings in the floor of a vertical drying chamber is disclosed. The nozzle includes a substantially cylindrical member that is coaxially mounted within the pulse jet engine exhaust pipe to extend from the exit opening thereof to a point below the termination of a material feedpipe that passes coaxially upward through the lower portion of the pulse jet engine exhaust pipe. In all cases, the nozzle is dimensioned and arranged to interact with the high temperature gaseous flow and acoustic field within the exhaust pipe to eliminate or greatly reduce adherence of material passing through the exhaust pipe which would otherwise accumulate as a burned, hardened substance and cause the pulse jet engines to malfunction and cease operating.

6 Claims, 3 Drawing Figures

MATERIAL INJECTION NOZZLE FOR PULSE JET DRYING SYSTEMS

BACKGROUND OF THE INVENTION

This invention relates to spray drying systems wherein the material to be dried is introduced into the exhaust stream of one or more pulse jet engines. More particularly, this invention relates to a material injection nozzle for use in such a drying system to thereby adapt the drying system for the processing of a variety of materials.

Various spray drying systems wherein pulse jet engines provide hot gaseous flow and broadband acoustic energy for removing or reducing the moisture content of solutions and liquids that contain suspended particulate matter are known to the art. For example, Lockwood, U.S. Pat. No. 3,618,655, and E. E. Anderson, U.S. Pat. No. 3,586,515, (both of which are assigned to the assignee of this invention) disclose pulse jet drying systems that are primarily addressed to dehydrating fish that is pulverized into a slurry to obtain fishmeal. Additionally, the copending patent application of Frederick Ferguson (assigned to the assignee of this invention and filed of even date with this application) discloses a pulse jet drying system which is configured to provide increased thermal efficiency and the high capacity processing of a wide variety of materials.

The pulse jet drying systems disclosed in the above noted patents and copending patent application are basically characterized in that the liquid containing the material to be removed or reclaimed is introduced into the exhaust pipe of one or more pulse jet engines at a predetermined distance from the exhaust pipe exit opening and is borne upwardly through openings in the floor of a vertically extending tank or chamber. The pulsating hot gaseous exhaust stream and the attendant high level acoustic energy atomizes or separates the injected material into a spray so that substantial evaporation occurs as the material travels along the pulse jet engine exhaust pipe. Further, each of the above mentioned systems is arranged to induce air currents which circulate upwardly and about the interior of the drying chamber to further dry the material being processed.

One of the disadvantages and drawbacks of prior art pulse jet drying systems such as the system disclosed in the previously mentioned patents to Lockwood and Anderson is that the system is not suitable for use in the drying of certain substances. In particular, in these systems the substance to be dried is introduced into the exhaust pipe of a pulse jet engine by means of a feedpipe that passes coaxially along the interior pulse jet engine exhaust pipe with the terminating end of the feedpipe being of the same geometry and size as the major portion of the feedpipe or, alternatively, being flared outwardly. In attempting to process liquids containing rather fine particles of organic or other temperature sensitive material, it has been found that partially dried particulate matter travelling through the pulse jet engine exhaust pipe adheres to the wall of the exhaust pipe. Because the exhaust pipe and the surrounding region of the drying chamber floor are hot, the adhering material rapidly forms a burned, hardened layer that continues to build up as the system operates. The buildup of such material not only causes smoke and cinders that can affect the quality of the dried material, but, more importantly, directly affects the operation of the pulse jet drying system. Specifically, as the material accumulates about the exit region of the exhaust pipe, the resonant operation of the pulse jet engine is affected and, when a sufficient amount of material has accumulated, the engine will cease to operate. When this occurs, the entire drying system must be shut down and the accumulated, burned material must be scraped and chipped away.

For example, in experimental tests for processing waste brewing liquids to reclaim yeast in which the feedpipe was configured according to the teachings of the Lockwood patent and terminated approximately 18½ inches below the pulse jet engine exhaust pipe exit opening, heavy buildup occured which caused the pulse jet engine to cease functioning after a very short processing interval. More specifically, in one such test the pulse jet drying system was operated for an initialization period of 40 minutes during which the yeast containing fluid was introduced into the pulse jet engine exhaust pipe at a rate of 1.875 gallons per minute. The material feed rate was then increased to approximately 2.625 gallons per minute and, after only slightly more than ten minutes of additional system operation, the pulse jet engine quit functioning. When the drying system was shut down and inspected it was determined that the uppermost 8 to 10 inches of the pulse jet engine exhaust pipe was heavily encrusted with burned yeast.

Considering the fact that even the more concentrated yeast solutions of conventional brewing processes have a yeast content of only about 30% and a weight of about 8.7 lbs. per gallon, it can be seen that the prior art material injection arrangement is not satisfactory for commercially reclaiming brewer's yeast. In particular, even if the prior art arrangement would operate over a sufficient time interval, a feed rate of 1.875 gallons per minute of the above mentioned 30% solid material provides approximately 300 lbs. per hour of dried brewer's yeast having a moisture content of approxximately 7% (per engine). Further, since yeast solutions which typically result from brewing processes do not typically include 30% solid material, but often have a solid content on the order of 10 to 20%, reclamation of the yeast at such low feed rates becomes even less attractive. Since systems of the type disclosed in the previously mentioned Lockwood patent typically operate with thermally efficiencies on the order of 50 to 60% and more efficient systems such as the system disclosed in the previously referenced copending application of Frederick Ferguson can attain drying efficiencies ranging between 80 and 95%, it can be recognized from the above mentioned experimental tests that the prior art arrangement for material injection not only would fail to provide satisfactory drying rates, but would be extremely wasteful of energy resources in drying heat sensitive, fine particulate matter such as brewer's yeast.

Accordingly, it is an object of this invention to provide a material injection nozzle which eliminates or greatly reduces the accumulation of burned material within and around the exhaust exit of the pulse jet engines utilized in a spray drying system.

It is another object of this invention to provide a material injection nozzle for the pulse jet engine of a spray drying system which permits high capacity drying of heat sensitive materials without requiring system interruption at short intervals to scrape and clean the system.

It is yet another and attendant object of this invention to provide an improved pulse jet drying system that is adapted for high capacity processing of liquids containing heat sensitive particulate matter.

SUMMARY OF THE INVENTION

These and other objects of this invention are achieved by eqipping a pulse jet drying system with a material injection nozzle that surrounds the terminus of the material feedpipe and extends upwardly to the exit opening of the pulse jet engine exhaust pipe, i.e., the floor of the drying chamber. The material injection nozzle includes a cylindrical member that is coaxially retained within the pulse jet engine exhaust pipe with the lower terminus of the cylindrical member being positioned a predetermined distance below the terminus of the material feedpipe. To maintain the upper end of the injection nozzle in axial alignment with the pulse jet engine exhaust pipe, the upper end of the cylindrical member includes a set of tabular spacers that are located at circumferentially spaced apart positions along the outer wall of the cylindrical member to extend radially outward and contact the inner wall of the pulse jet engine exhaust pipe. The lower end of the cylindrical member is affixed to the terminal region of the material feedpipe by a similar set of spacers which project radially outward from the material feedpipe, through the wall of the cylindrical member, and into abutment with the inner wall of the pulse jet engine exhaust pipe.

In accordance with the invention, both the dimensions of the cylindrical member and the distance that the cylindrical member extends below the terminus of the feedpipe, are important in preventing the formation of hardened burned accumulations in and around the terminal region of the pulse jet engine exhaust pipe when heat sensitive, fine particulate matter that is suspended or mixed in water or another fluid is processed to remove or reclaim such particulate material. In this respect, although the interaction of the material injection nozzle with the complex high temperature, highly turbulent exhaust flow and the inner action of the material injection nozzle with the complex acoustic field within the pulse jet engine exhaust pipe is not completely understood, it has been experimentally determined that various dimensions of the material injection nozzle must be selected in view of the structural and acoustical configuration of the pulse jet engine drying system in order to provide satisfactory performance at commercially acceptable material feed rates. For example, while developing the embodiment of the invention disclosed herein, it was found that variations on the order of 20 to 25 percent in the length and diameter of the cylindrical member resulted in a two-fold increase in the processing capacity of the drying system in that properly dimensioning the material injection nozzle allowed at least two times as great a material feed rate without substantial buildup within the exit region of the pulse jet engine exhaust pipes.

BRIEF DESCRIPTION OF THE DRAWINGS

Other objects and advantages of the present invention will become apparent to one skilled in the art after reading the following descriptions taken together with the accompanying drawings in which.

DETAILED DESCRIPTION

Figure 1:
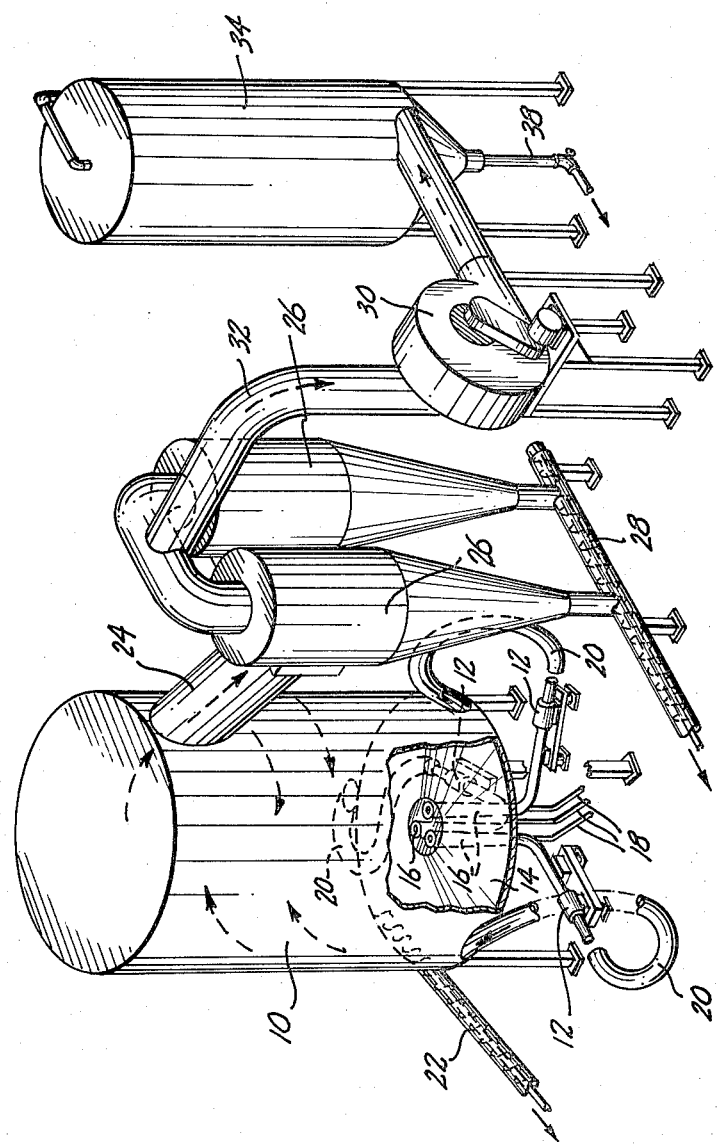
FIG. 1 is an isometric view of a pulse jet engine drying system which includes a material injection nozzle in accordance with this invention.

FIG. 1 schematically depicts a pulse jet engine drying system of the type, which through incorporation of this invention, can be adapted for processing a variety of materials that have heretofore been amenable only to more conventional drying methods. Such materials generally include liquid suspensions or fluid mixtures containing very small particles of heat sensitive and often organic substances; the example utilized herein being the recovery of dried brewer's yeast from liquid byproducts obtained during the manufacture of alcoholic beverages. It should be noted that, although the particular pulse jet engine drying system of FIG. 1 corresponds to the system disclosed in the previously referenced patent application of Frederick Ferguson, the hereinafter described material injection nozzle is equally applicable to pulse jet drying systems such as those described in the previously referenced patents to Lockwood and Anderson. In this respect, the teachings of such patent applications and patent reference are hereby incorporated by reference thereto and it should be recognized that this invention applies to all drying systems having the basic configuration and characteristics discussed hereinafter.

Basically the pulse jet engine drying system depicted in FIG. 1 includes a drying chamber 10 wherein one or more pulse jet engines 12 is mounted to discharge hot exhaust gases and broadband acoustic energy upwardly through the floor 14 of the drying chamber 10. In such a system, the material to be dried is introduced into the exhaust pipes 16 of the pulse jet engines 12 through feedpipes 18 that extend into and partially through the pulse jet engine exhaust pipes 16. In this respect, the material being processed can be in any fluid or semifluid state including slurries, solutions and liquid suspensions with the system including one or more pumps (not shown in FIG. 1) that establish sufficient fluid pressure to move the material through the feedpipes 18 and into the hot gaseous flow that is supplied by the pulse jet engines 12. The fluidic material entering the high temperature, turbulent gaseous exhaust stream is immediately atomized or separated into individual moisture laden particles and substantial moisture removal occurs as the material is borne upwardly through the remaining portion of the exhaust pipes 16 and into the lower region of the drying chamber 10. Additional moisture removal is affected as the partially dried particulate matter is swept upwardly and about the interior of the drying chamber 10 by the upwardly directed exhaust streams of the pulse jet engines 12 and interacting airstreams that are introduced into the lower region of the drying chamber 10. In this respect, in the system depicted in FIG. 1, air augmentation ducts 20 extend between circumferentially spaced apart openings along the lower portion of the drying chamber 10 and the air inlet openings of an associated pulse jet engine 12. As is described in detail in the previously referenced copending patent application, each air augmentation duct 20 is configured and arranged to direct hot gaseous flow that is emitted through the inlet opening of the associated pulse jet engine 12 and ambient air that is entrained therewith tangentially into the drying chamber 10 to establish circumferential airflow around the drying chamber floor 14. This circumferentially circulating airflow interacts with the upwardly directed exhaust streams of the pulse jet engines 12 to produce air currents which carry the particulate matter upwardly and about the interior of the drying chamber 10 in the previously mentioned manner. Alternatively, as disclosed in the previously referenced patent to Lockwood, additional heated airstreams that interact with the upwardly directed exhaust flow of the pulse jet engines 12 can be supplied by additional pulse jet engines that are mounted about the lower wall region of the drying chamber 10.

As the rising particulate matter is dried, the heaviest portions thereof fall downwardly to the drying chamber floor 14 and are removed. For example, in the system of FIG. 1, the material falling to the floor of the drying chamber is swept circumferentially thereabout by the flow from the air augmentation ducts 20 and removed from the drying chamber 10 by means of a conventional auger type conveyor 22. The portion of the dried material which remains in the upwardly rising circulating air currents of the drying chamber 10 exits the drying chamber through a product outlet duct 24 and enters one or more conventional cyclone separators 26 which deliver the dried particulate matter to a second conventional auger type conveyor system 28. To cause the dried product to enter the cyclone separators 26, a conventional blower 30 is interconnected with the exhaust duct 32 of the cyclone separators 26. In systems in which emission control is desired, the air displaced by the blower 30 is routed to conventional emission control equipment such as a wet scrubber unit 34 which removes any remaining particulate matter and discharges an effluent containing such material through a drain line 38.

Figure 2:
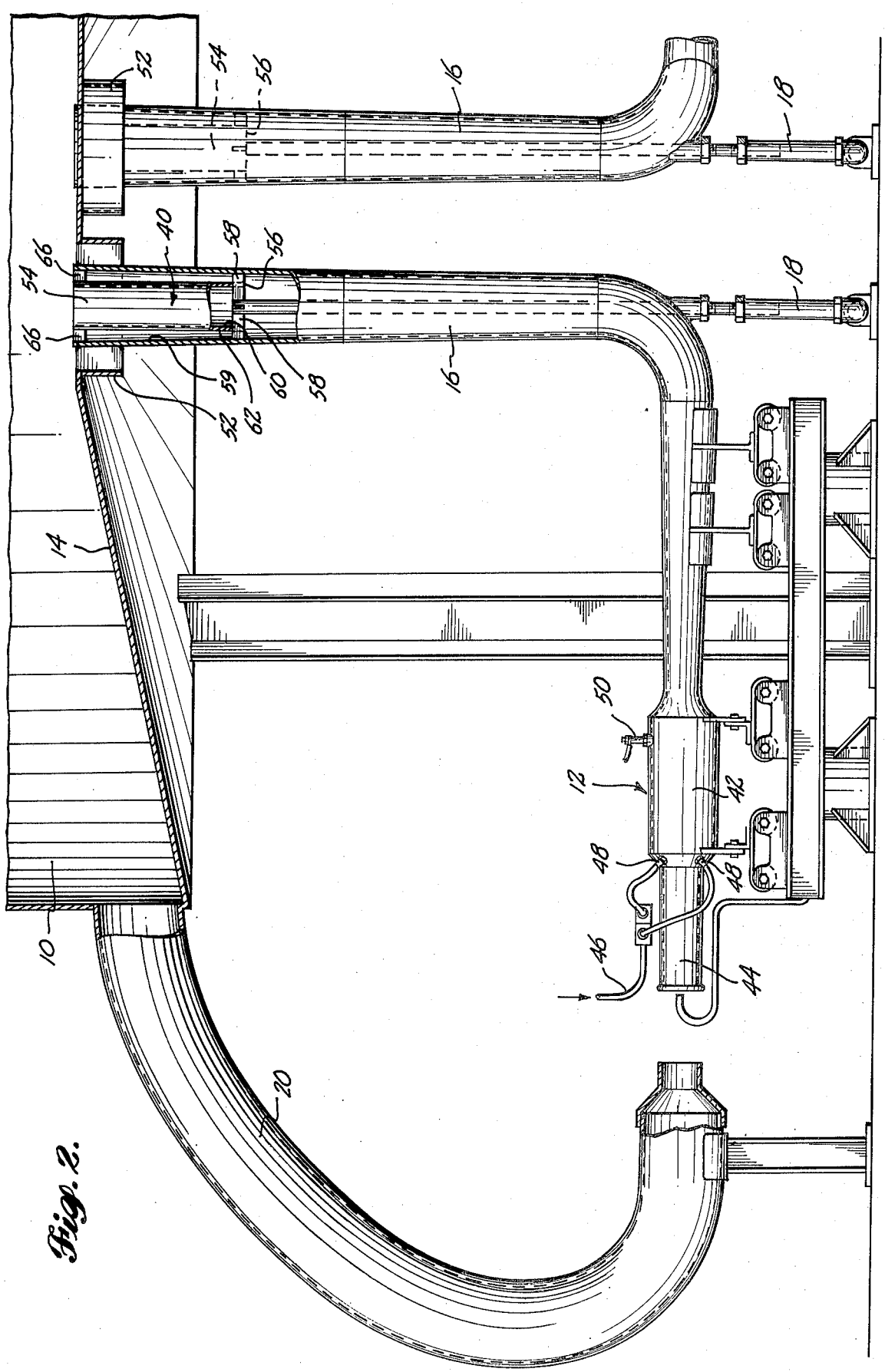
FIG. 2 is a partial side elevation view of the drying chamber of the system depicted in FIG. 1 which illustrates the overall arrangement of the pulse jet engines and the material injection nozzle; and, FIG. 3 is a partially cut away isometric view of one of the pulse jet engine exhaust pipes and the material injection nozzle contained therein.
Figure 3:
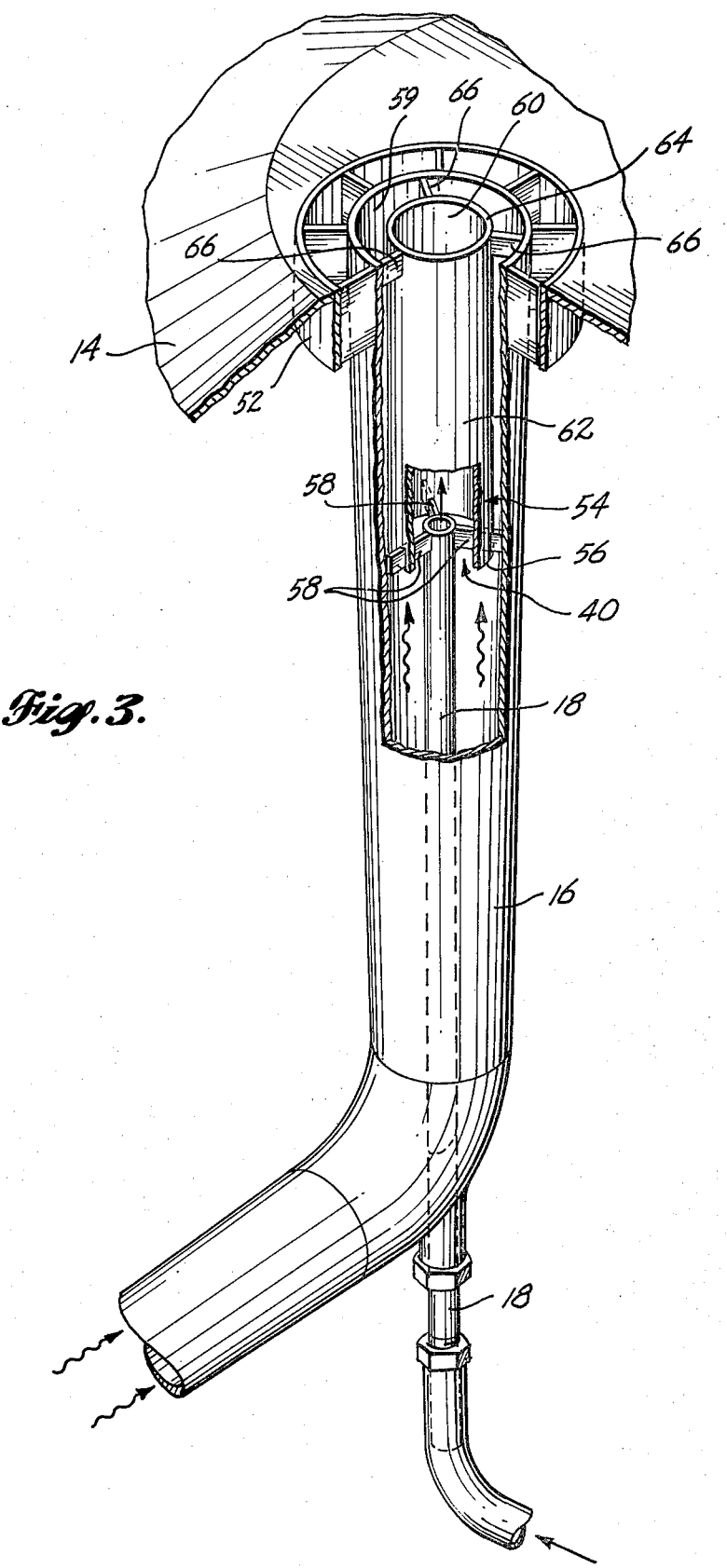

With the particular reference to FIGS. 2 and 3, which more clearly illustrate the arrangement of the pulse jet engines 12 in the system of FIG. 1 and a material injection nozzle of this invention (generally denoted by the numeral 40), it can be seen that each pulse jet engine exhaust pipe 16 slowly and smoothly increases in cross-sectional area as it extends from the aft terminus of the pulse jet engine combustion chamber 42. More specifically, in the depicted arrangement, such exhaust pipe 16 extends radially inward beneath the drying chamber floor 14 to a point near the center of the drying chamber 10 and is then curved to pass upwardly to intersect with the drying chamber floor 14. The pulse jet engine exhaust pipe 16, the combustion chamber 42 and the engine air inlet section 44, which extends axially outward from the opposite end of the combustion chamber 42, are preferably circular in cross-sectional geometry with the inlet section 44 and exhaust pipe 16 being uniformly divergent along a path taken from the entrance opening of the air inlet section 44 to the terminus of the exhaust pipe 16.

Although the depicted pulse jet engines 12 differ from the more conventional U-shaped pulse jet engines utilized in the pulse jet engine drying system of the previously referenced patent to Lockwood, the engines 12 operate in substantially the same manner. In particular, fuel is supplied to the combustion chamber 42 via a fuel supply line 46 that is interconnected with one or more fuel nozzles 48 which project inwardly into the combustion chamber 42. When operation of the pulse jet engine 12 is initiated, a combustible mixture of fuel and air is introduced into the combustion chamber 42 and ignited by a conventional ignitor 50. The rapid expansion of the combustion causes hot combustion gases to be expelled outwardly through the exhaust pipe 16 and air inlet section 44 to thereby create a partial vacuum within the combustion chamber 42. The vacuum within the combustion chamber 42 then causes fresh ambient air to flow into the combustion chamber through the air inlet section 44 and introduction of an additional charge of fuel through the fuel nozzles 48. The combustible mixture of fuel and air is then ignited and the cycle of operation repeated. After the engine begins operating, the igniter 50 can be deenergized and the engine will continue cyclic or pulsating combustion of the induced air and fuel because of the high temperatures attained within the combustion chamber 42.

Regardless of whether the drying system utilizes the substantially L-shaped pulse jet engines illustrated herein or the more conventional U-shaped engines employed in the drying system of the Lockwood patent, the material feedpipes 18 pass upwardly into and coaxially along the pulse jet engine exhaust pipes 16. In prior art systems, such as that of the Lockwood patent, the feedpipe 18 is simply terminated so that the exit opening exhibits a size and geometry identical to that of the flow passage through the feedpipe 18 or, alternatively, was flared outwardly (divergent) along the final portion of the feedpipe 18. Thus, in the prior art systems, the material to be dried is simply introduced into the final portion of the pulse jet engine exhaust pipe 16. As previously mentioned, although such a configuration provides fairly satisfactory system operation in processing rather coarse or fibrous materials such as the production of fishmeal from pulverized or slurried fish that is mentioned in the Lockwood patent, such a configuration does not provide satisfactory operation in the processing of finely divided particulate matter that is far more sensitive to overheating. In this respect, such materials adhere to the inner surfaces of the terminal region of the exhaust pipes 16 and, in a system so equipped, in and around air augmentation rings 52 which extend downwardly to coaxially surround the upper end of the pulse jet exhaust pipes 16. These air augmentation ducts permit cool ambient air to be drawn into and entrained with the hot engine exhaust gases to thereby decrease the temperature and increase the upwardly directed thrust provided by the exhaust gases.

By way of illustrative example, it was found that when an aqueous suspension of brewer's yeast having a solid content of approximately 10 to 20% (by weight) was introduced into the exhaust pipe 16 through a feedpipe 18 that was simply terminated 18½ inches below the end of the exhaust pipe 16, burned and hardened yeast was formed on the uppermost 8 to 10 inches of the interior surface of the exhaust pipe 16 with the substance accumulating to the point at which the pulse jet engine ceases operation. In this respect, such accumulation and system failure occur after only a few minutes of operation even though the material feed rate is maintained at less than half of that utilized when other types of material are being processed.

Referring still to FIGS. 2 and 3, the material injection nozzle 40, which eliminates the above discussed problems and disadvantages of the prior art drying systems, includes a cylindrical member 54 that coaxially surrounds the termination of the material feedpipe 18 and projects coaxially upward along the interior of the pulse jet engine exhaust pipe 16. More specifically, the lower edge 56 of the cylindrical member 54 is positioned a predetermined distance below the end of the feedpipe 18 and is affixed to the outer surface of the feedpipe by three circumferentially spaced apart, substantially rectangular mounting tabs 58 that extend radially outward to the inner surface 59 of the exhaust pipe 16. Each mounting tab 58 projects through a rectangular groove in the cylindrical member 54 and extends into abutment with the inner surface 59 of the exhaust pipe 16. Alternatively, the mounting tabs 58 can be configured as separate sections that respectively span the annular open region between the feedpipe 18 and the cylindrical member inner surface 60 and the annular open region formed between the cylindrical member outer surface 62 and the inner surface 59 of the exhaust pipe 16. In either case, the mounting tabs 58 are preferably welded, or otherwise attached to the cylindrical member 54 but are not physically interconnected with the exhaust pipe 16 so as to permit ease of removal and replacement and allow for significant thermally induced expansion and contraction. The upper edge 64 of the cylindrical member 54 is preferably about flush with the terminus of the exhaust pipe 16 and the surrounding region of the drying chamber floor 14 and is maintained in a coaxial orientation by upper mounting tabs 66. Like the lower mounting tabs 58, the upper mounting tabs 66 are substantially rectangular in geometry and extend from circumferentially spaced apart positions along the outer surface 62 of the cylindrical member 54 to span the annular open region defined between the cylindrical member 54 and the exhaust pipe 16.

The exact manner in which the material injection nozzle 40 operates to eliminate or reduce the accumulation of burned material within the terminal portion of the exhaust pipe 16 and the open annular region of the air augmentation ring 52 is not completely understood. In this respect, it is theorized that the material injection nozzle 40 interacts both with the high temperature, turbulent gaseous flow and complex acoustic pressure field within the exhaust pipe 16. For example, it has been experimentally determined that the material injection nozzle 40 does not prevent the previously described deposit and accumulation of burned substance simply because the cylindrical member 54 does not allow the partially dried material to contact the exhaust pipe inner surface 60. In particular, because of the pulsating gaseous flow within the exhaust pipe 16, a portion of the particulate matter still flows around the lower edge 56 of the cylindrical member 54 and passes upwardly through the annular region formed between the cylindrical member 54 and the exhaust pipe 16. Even more importantly, it has been experimentally determined that replacing the cylindrical member 54 with a convergent or divergent tubular section has a significant and undesirable effect on the drying system in that little or no improvement is achieved over the simple feedpipe termination of the prior art.

Because use of the cylindrical member 54 provides substantial and unexpected improvement over similar arrangements which utilize variously configured convergent and divergent tubular sections, it is believed that the substantially circular cross-sectional geometry of the material injection nozzle 40 alters fluid flow conditions within the exhaust pipe 16 to greatly improve system operation. For example, since initial contact and adherence of the upwardly directed, partially dried particles with the exhaust pipe inner surface 59 or the inner surface 60 of the cylindrical member 54 is a function of particle moisture content as well as particle speed and direction of travel, it would appear that the cylindrical member 54 improves flow conditions within the upper region of the exhaust pipe 16 by effectively acting as a "flow-straightener" which reduces the radially directed component of particle velocity and further prevents mixing of a substantial portion of the engine exhaust gases with air drawn through the air augmentation ring 52 until the exhaust gases have passed beyond the hot surfaces of the exhaust pipe 16, air augmentation ring 52 and adjacent portion of the drying chamber floor 14. That is, since the cylindrical member 54 has a constant cross-sectional area which guides a large portion of both the high temperature, high velocity exhaust gases and particulate matter carried therein upwardly without substantially altering the vertical directed component of particle velocity the number of particles which impinge on a hot surface would appear to be reduced. Further, since the gaseous flow stream and particles that are exited from the upper end of the cylindrical member 54 are isolated from the cool ambient air that is drawn through the air augmentation ring 52 by the exhaust gases that pass through the annular region surrounding the cylindrical member 54, it would appear that a substantial portion of the particulate matter passing from the cylindrical member 54 is not exposed to the turbulent mixing action until such particles has passed adequately beyond the hot surfaces of the exhaust pipe 16, the air augmentation ring 52 and cylindrical member 54.

Although the above discussed fluid flow factors would seem to partially account for the superior performance characteristics of the material injection nozzle 40, sensitivity of the device to changes in geometry and dimensional size indicates that performance is likely related to the interaction between the injection nozzle and the acoustic pressure field within the exhaust pipe 16. In this respect it is known that each of the pulse jet engines operate at a resonant frequency that is determined by various dimensions such as the length and diameter of the air inlet section 44, the combustion chamber 42 and the exhaust pipe 16 and it is also known that the combustion of gases within such an engine produces high level acoustic energy which exceeds 150 db and encompasses a frequency range extending from around 250 to 1250 Hertz. Because of this and the turbulent flow conditions within the exhaust pipe 16, extremely complex acoustic pressure fields exist within the exhaust pipe 16 and the drying chamber 10. As is known in the art, the acoustic pressure waves contained in this complex acoustic field aids in removing moisture from the material being processed. However, because of the high level acoustic energy present, mechanical resonance of the exhaust pipes 16 and various other components of the drying system can occur and standing waves or pressure nodes can be induced at various points along the exhaust pipe 16. Thus, it is theorized that the injection nozzle 40 alters the acoustic conditions within the terminal portion of the exhaust pipe 16 in a manner which eliminates the previously described buildup of burned material. For example, the material injection nozzle 40 may be itself resonating at one of the dominant acoustic frequencies to create substantial upwardly directed velocity to the particles passing thereby to effect substantial moisture removal and prevent the partially dried particles from adhering to the adjacent structure. On the other hand, the material injection nozzle 40 may, through interaction with the exhaust pipe 16, act as an acoustic matching section which prevents the formation of a low pressure node at the exit region of the exhaust pipe 16 which could otherwise occur as the hot gaseous exhaust flow and acoustic energy interfaces with the cooler air at the floor 14 of the drying chamber 10. At any rate, it is important to maintain the geometry of the material injection nozzle 40 as disclosed above and, to provide optimal performance, dimension the material injection nozzle 40 so as to provide satisfactory performance with each particular drying system.

With respect to the above mentioned dimensional constraints it has been found that the terminus of the feedpipe 18 should be positioned about 15 to 20 inches below the exit opening of the exhaust pipe 16 with the exact location depending on the type of particulate matter being dried and its sensitivity to the high temperatures flow within the exhaust pipe 16. For example, distances of 16 to 18½ inches are believed satisfactory in processing yeast materials. Further, it has been found that the diameter of the cylindrical member 54 should be on the order of 50 to 60% of the final diameter of the exhaust pipe 16 with the wall thickness of the cylindrical member 54 being about ¼ inch. Additionally, the lower edge 56 of the cylindrical member 54 should be slightly below the terminus of the feedpipe 18 with about a 1 inch overlap being most effective. Preferably, the upper edge 64 of the cylindrical member 54 is positioned near or flush with the terminus of the exhaust pipe 16.

In one embodiment of the invention wherein the pulse jet engines 12 exhibit a resonant frequency of approximately 125 Hertz, the exhaust pipes 16 extend horizontally for a distance of 41 inches and then upwardly for a distance of about 72 inches with the exhaust pipes 16 having an initial diameter of 3.125 inches and a final inner diameter of 7.25 inches, the system was adapted for the high capacity drying of brewer's yeast by terminating the feedpipe 17 inches below the terminus of the exhaust pipes 16 and utilizing a cylindrical member 54 having a 4½ inch inner diameter, a ¼ inch wall and an 18 inch length so that the cylindrical member 54 extended downwardly from the exit opening of the exhaust pipe 16 to a point 1 inch below the terminus of the feedpipe 18. In this embodiment of the invention it was found that liquid brewer's yeast could be supplied to each of the engines at a material feed rate of 4.7 gallons per minute without noticeable accumulation of burned material within the upper region of the exhaust pipe 16 or the air augmentation rings 52. In comparison, simply terminating the feedpipe 18 in the manner of the prior art caused significant accumulations and the engines failed after a few minutes of operation at a material feed rate of 2.6 gallons per minute. Thus, it can be recognized that the material injection nozzle 40 of this invention permits commercial scale processing of such material whereas the prior art system does not. In this respect, tests on the above described system utilizing the material injection nozzle 40 with liquid yeast material containing approximately 10 to 20% solids (by weight) permitted continuous operation of the system over satisfactory periods of time and yielded yeast material having a moisture content of approximately 7 percent per hour.

It will be recognized that various modifications can be made in the herein disclosed material injection nozzle without departing from the scope and spirit of this invention and it is therefore intended that the claims set forth hereinafter not be deemed restricted to the details of the illustrations as such.

The embodiments of the invention in which an exclusive property or privilege is claimed are defined as follows:

1. A material injection nozzle for a pulse jet drying system of the type wherein the material to be dried flows through a material feedpipe which passes into and along the exhaust pipe of a pulse jet engine for introduction of the material into the hot gaseous flow stream and high level acoustic energy within said exhaust pipe and wherein said material feedpipe is terminated a predetermined distance from the exhaust opening of said exhaust pipe, said material injection nozzle comprising:

a substantially cylindrical member positioned coaxially within the terminal region of said pulse jet engine exhaust pipe, said cylindrical member coaxially surrounding at least the terminal portion of said material feedpipe, said cylindrical member being dimensioned for interaction with said high temperature gaseous flow stream and said acoustic energy within said exhaust pipe to prevent accumulation of portions of said material being dried on said exhaust pipe and said cylindrical member; and mounting means for retaining said cylindrical member within said terminal portion of said pulse jet engine exhaust pipe.

2. The material injection nozzle of claim 1 wherein said cylindrical member extends from about said exit opening of said pulse jet engine exhaust pipe to a position that lies a predetermined distance upstream of the termination of said material feedpipe.

3. The material injection nozzle of claim 2 wherein said cylindrical member has a diameter between about 50% and about 60% of the diameter of said exit opening of said pulse jet engine exhaust pipe.

4. In a drying system wherein one or more pulse jet engines are mounted with the exhaust pipes thereof in fluid communication with a drying chamber and a material feedpipe is routed into and coaxially along the interior of at least one of said pulse jet engine exhaust pipes with said feedpipe being terminated a predetermined distance from the exit opening of said exhaust pipe, the improvement comprising a material injection nozzle for adapting said drying system for use with fine particulate heat sensitive material, said material injection nozzle comprising:

a substantially cylindrical member mounted in coaxial relationship with said exhaust pipe and said material feedpipe, said cylindrical member extending inwardly into said exhaust pipe from said exhaust pipe exit opening and beyond the terminus of said feedpipe by a predetermined distance; and mounting means for retaining said feedpipe and said cylindrical member in said coaxial orientation within said pulse jet engine exhaust pipe.

5. The improved drying system of claim 4 wherein said cylindrical member has a diameter between about 50% and 60% of the diameter of said pulse jet engine exhaust pipe exit opening.

6. The improved drying system of claim 5 wherein the diameter of said exit opening of said pulse jet engine exhaust pipe is about 7.25 inches and said feedpipe is terminated about 17 inches from said exhaust opening and wherein said cylindrical member has an inner diameter of about 4½ inches, a wall thickness of about ¼ inch and a length of about 18 inches to extend from said exhaust pipe exit opening to a point about 1 inch beyond said terminus of said feedpipe.

* * * * *